Patented Apr. 29, 1952

2,594,570

UNITED STATES PATENT OFFICE 2,594,570

ISOMERIZATION OF ALPHA-BETA UNSATURATED CARBOXYLIC ACIDS

Carl B. Linn, Riverside, Ill., assignor to Universal Oil Products Company, Chicago, Ill., a corporation of Delaware No Drawing. Application November 28, 1950,
Serial No. 198,050

9 Claims. (Cl. 260—537)

This invention relates to the conversion of cis alpha-beta unsaturated carboxylic acids to their trans isomers, and more particularly to the conversion of maleic acid to fumaric acid.

An object of this invention is to convert cis alpha-beta unsaturated carboxylic acids into trans alpha-beta unsaturated carboxylic acids.

Another object of this invention is to convert maleic acid into fumaric acid.

One embodiment of this invention relates to a process which comprises reacting a cis alpha-beta unsaturated carboxylic acid in the presence of a catalyst comprising essentially a carbonyl compound at an isomerization temperature and recovering the resultant trans alpha-beta unsaturated carboxylic acid.

Another embodiment of this invention relates to a process which comprises reacting maleic acid in the presence of a catalyst comprising essentially a carbonyl compound at an isomerization temperature, and recovering the resultant fumaric acid.

Heretofore the isomerization of maleic acid to fumaric acid has been accelerated by various inorganic materials such as iodine, bromine, hydrochloric acid, hydrobromic acid, sulfuric acid, potassium thiocyanate, sodium bromide and ammonia. Pyridine has also been employed for this purpose as well as certain aryl and alkyl thioureas. A mechanism proposed for this isomerization and a discussion of the prior art are given in the publication of Nozaki and Ogg in the Journal of the American Chemical Society, volume 63, page 2583 (1941) and by Nozaki in Journal American Chemical Society, volume 63, page 2681 (1941). As indicated in the prior art, the catalysts used for the isomerization of maleic acid are also usable for promoting the cis-trans isomerization of other alpha-beta unsaturated carboxylic acids. The same is also true of the carbonyl compound catalysts of the present invention.

While this invention is described in particular detail for the isomerization of maleic acid to fumaric acid, it is also applicable, as indicated above, to the cis-trans isomerization of other alpha-beta unsaturated carboxylic acids; for example, isocrotonic acid, citraconic acid, isocinnamic acid and cis-methyl glutaconic acid and the like.

Carbonyl compounds useful as catalysts for the cis-trans isomerization of alpha-beta unsaturated carboxylic acids comprise aldehydes and ketones, including cyclic ketones, particularly cycloalkanones such as cyclohexanone.

The process is carried out in either batch or continuous types of operation by contacting the cis alpha-beta unsaturated carboxylic acid in the presence of a carbonyl compound catalyst at a temperature of from about 50° to about 250° C. and preferably at a temperature of from about 100° to about 200° C. This process is carried out at atmospheric pressure or at a superatmospheric pressure which is generally not more than about 100 atmospheres in the presence of from about 0.1 to about 10% by weight of the carbonyl compound based upon the weight of the alpha-beta unsaturated carboxylic acid charged to the process.

The nature of the present invention is illustrated further by the following examples which should not be misconstrued as imposing undue limitation upon the generally broad scope of the invention.

Example I

A 500 cc. flask equipped with a thermometer, mercury sealed stirrer, and reflux condenser connected with a gas collecting train was charged with 186 grams of maleic acid and 10 grams of cyclohexanone. The stirrer was then started and the reaction mixture was heated to a temperature of 150° C. which was maintained for four hours during which time the reaction mixture changed from a liquid (maleic acid melts at about 135° C.) to essentially a crystalline solid. During the time of heating, a total of 450 cc. of carbon dioxide was evolved.

The reaction mixture was then cooled, and a representative sample (15 grams) of the solid product was dissolved in 250 grams of boiling water, the solution was filtered and cooled to 10° C. Crystals removed from the cooled solution amounted to 10 grams thus indicating fumaric acid since a like quantity of maleic acid would have been completely soluble in the 250 grams of water at 10° C. The crystalline solid was recrystallized four times from water and dried. The dried crystals sublimed at a temperature of 260° C. Elementary analysis of these crystals gave the values C, 41.66%; H, 3.66%. These values correspond closely with the analyses calculated for fumaric acid, $C_4H_4O_4$: C, 41.3%; H, 3.45%.

Example II

A glass-lined, rotatable, steel autoclave of 850 cc. capacity was charged with 183 grams of maleic acid and 1.9 grams of cyclohexanone. The charged autoclave was then heated for 10 hours at a temperature of 150° C. After the autoclave and its contents had cooled to 20° C., a total of 900 cc. of gas was recovered therefrom analyzing 91% carbon dioxide and 9% of carbon monoxide. A representative sample of 15 grams of the resultant product was dissolved in 200 grams of boiling water, the solution was filtered and cooled, and the crystals recovered from the filtrate (after drying) weighed 11.9 grams. These crystals sublimed at a temperature of 260° C. Essentially complete conversion of the maleic acid into fumaric acid had occurred.

I claim as my invention:

1. A process which comprises reacting a cis alpha-beta unsaturated carboxylic acid in the presence of a catalyst comprising essentially a cycloalkanone at an isomerization temperature and recovering the resultant trans alpha-beta unsaturated carboxylic acid.

2. A process which comprises reacting maleic acid in the presence of a catalyst comprising essentially a cycloalkanone at an isomerization temperature, and recovering the resultant fumaric acid.

3. A process for producing trans alpha-beta unsaturated carboxylic acid which comprises reacting cis alpha-beta unsaturated carboxylic acid in the presence of a cycloalkanone catalyst at a temperature of from about 50° to about 250° C.

4. A process for producing trans alpha-beta unsaturated carboxylic acid which comprises reacting cis alpha-beta unsaturated carboxylic acid in the presence of from about 0.1 to about 10% by weight of a cycloalkanone catalyst at a temperature of from about 50° to about 250° C.

5. A process for producing trans alpha-beta unsaturated carboxylic acid which comprises reacting cis alpha-beta unsaturated carboxylic acid in the presence of from about 0.1 to about 10% by weight of a cyclohexanone catalyst at a temperature of from about 50° to about 250° C.

6. A process for producing trans alpha-beta unsaturated carboxylic acid which comprises reacting cis alpha-beta unsaturated carboxylic acid in the presence of from about 0.1 to about 10% by weight of cyclohexanone at a temperature of from about 50° to about 250° C.

7. A process for producing trans alpha-beta unsaturated carboxylic acid which comprises reacting cis alpha-beta unsaturated carboxylic acid in the presence of from about 0.1 to about 10% by weight of cyclohexanone at a temperature of from about 100° C. to about 200° C.

8. A process for producing fumaric acid which comprises reacting maleic acid at a temperature of from about 50° to about 250° C. in the presence of from about 0.1 to about 10% by weight of cyclohexanone, and recovering the resultant fumaric acid.

9. A process for producing fumaric acid which comprises reacting maleic acid at a temperature of from about 100° to about 200° C. in the presence of from about 0.1 to about 10% by weight of cyclohexanone, and recovering the resultant fumaric acid.

CARL B. LINN.

REFERENCES CITED

The following references are of record in the file of this patent:

UNITED STATES PATENTS

| Number    | Name        | Date           |
|-----------|-------------|----------------|
| 1,318,633 | Weiss et al. | Oct. 14, 1919 |
| 1,424,138 | Bailey et al. | July 25, 1922 |
| 2,441,238 | Dunlop      | May 11, 1948   |
| 2,500,260 | Newton      | Mar. 14, 1950  |

OTHER REFERENCES

Jennen: Chem. Abs., vol. 32, p. 500 (1938).
Hurd et al.: Chem. Abs., vol. 32, p. 1657 (1938).